US012790976B1

(12) United States Patent
Cenker et al.

(10) Patent No.: US 12,790,976 B1
(45) Date of Patent: Nov. 10, 2026

(54) PRECHAMBER WITH VARIABLE NOZZLE ORIFICE FOR IMPROVED IGNITION AND COMBUSTION CONTROL

(71) Applicant: SAUDI ARABIAN OIL COMPANY, Dhahran (SA)

(72) Inventors: Emre Cenker, Dhahran (SA); Abdullah S. AlRamadan, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/269,116

(22) Filed: Jul. 15, 2025

(51) Int. Cl.

| | |
|---|---|
| ***F02B 19/12*** | (2006.01) |
| ***F02B 19/10*** | (2006.01) |
| ***F02B 19/18*** | (2006.01) |
| *F02M 23/04* | (2006.01) |

(52) U.S. Cl.

CPC ............ *F02B 19/12* (2013.01); *F02B 19/108* (2013.01); *F02B 19/18* (2013.01); *F02M 23/04* (2013.01)

(58) Field of Classification Search

CPC ........ F02B 19/12; F02B 19/108; F02B 19/18; F02M 23/04; F02M 23/006; F02M 23/14; F02M 27/04

See application file for complete search history.

(56) References Cited

U.S. PATENT DOCUMENTS

| | | | | |
|---|---|---|---|---|
| 5,024,193 | A * | 6/1991 | Graze, Jr. | F02B 19/1023 123/259 |
| 11,085,402 | B1 * | 8/2021 | Vroman | F02M 23/04 |
| 11,156,147 | B1 | 10/2021 | Yu et al. | |
| 11,156,148 | B1 | 10/2021 | Engineer | |
| 11,293,337 | B1 | 4/2022 | Czekala et al. | |
| 11,300,038 | B2 | 4/2022 | Seba et al. | |
| 11,378,002 | B1 | 7/2022 | Leone et al. | |
| 11,821,353 | B2 | 11/2023 | Harada et al. | |
| 2017/0074224 | A1 * | 3/2017 | Ge | F02B 19/108 |
| 2021/0340899 | A1 | 11/2021 | Hoag et al. | |

FOREIGN PATENT DOCUMENTS

WO 2023021531 A1 2/2023

OTHER PUBLICATIONS

M. Silva, et al., "Effects of Geometry on Passive Pre-Chamber Combustion Characteristics," SAE Technical Paper 2020-01-0821, 2020 (11 pages).

L. A. Gussak, et al., "The Application of Lag-Process in Prechamber Engines," Society of Automotive Engineers, Inc., 1980 (26 pages).

(Continued)

*Primary Examiner* — Syed O Hasan

(74) *Attorney, Agent, or Firm* — Osha Bergman Watanabe & Burton LLP

(57) ABSTRACT

A system for a prechamber for an internal combustion engine are provided. The prechamber may include a conical main prechamber body with a first end and a second end, a conical internal prechamber member, a rotating extension arm and a plurality of nozzles. A method of operating a prechamber in an active mode in an internal combustion engine is provided. A method of operating a prechamber in a passive mode in an internal combustion engine is provided.

19 Claims, 9 Drawing Sheets

(56) References Cited

OTHER PUBLICATIONS

A. Shah, et al., "Effect of Pre-Chamber Volume and Nozzle Diameter on Pre-Chamber Ignition in Heavy Duty Natural Gas Engines," SAE Technical Paper 2015-01-0867, 2015 (11 pages).
P. S. Hlaing, "Influence of Internal Geometry on Pre-Chamber Combustion Concept in a Lean Burn Natural Gas Engine," Dissertation, King Abdullah University of Science and Technology, 2022 (193 pages).
E. Shapiro, et al., "Experimental and Numerical Analysis of Pre-Chamber Combustion Systems for Lean Burn Gas Engines," ETH Library, 2019 (13 pages).
X. Leng, et al., "Impact of the prechamber nozzle orifice configurations on combustion and performance of a natural gas engine," Thermal Science, vol. 22, No. 3, pp. 1325-1337, 2018 (13 pages).
T. Yu, "Numerical investigation of jet formation, penetration and ignition in prechamber gasoline engines," PhD Thesis Submitted to Purdue University, 2024 (94 pages).

* cited by examiner

PRECHAMBER WITH VARIABLE NOZZLE ORIFICE FOR IMPROVED IGNITION AND COMBUSTION CONTROL

BACKGROUND

Improving fuel efficiency in Internal Combustion Engines (ICEs) reduces harmful emissions into the environment. A pathway to improve the fuel efficiency of spark-ignited (SI) engines is to increase the compression ratio; however, this can lead to engine knock. Utilizing lean air-fuel mixtures in SI engines significantly improves fuel efficiency, reduces emissions, reduces knock propensity, and allows for the design of higher compression ratios; however, lean air-fuel mixtures are more difficult to ignite and sustain combustion, resulting in misfiring and ultimately increased pollutant emissions. Prechambers may be used to improve the combustion of lean air-fuel mixtures, resulting in higher rates of heat release caused by multiple ignition sites. Accordingly, there exists a need for an optimized prechamber design that improves engine efficiency while reducing emissions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a prechamber for an internal combustion engine. The prechamber includes a conical main prechamber body with a first end and a second end, a conical internal prechamber member, a rotating extension arm and a plurality of nozzles. The conical internal prechamber member is positioned at the second end of the conical main prechamber body. The rotating extension arm has a mechanical linkage to the conical internal prechamber member, extending from the conical internal prechamber member and through the first end of the conical main prechamber body to an actuator. The plurality of nozzles is formed at an interface between the conical main prechamber body and the conical internal prechamber member and is in fluid communication with a main combustion chamber of the internal combustion engine. The actuator controls and varies a size of each of the plurality of nozzles by moving the rotating extension arm upwards and downwards relative to the conical main prechamber body. In another aspect, embodiments disclosed herein relate to a method of operating a prechamber in an active mode in an internal combustion engine using a system. The system includes a conical main prechamber body with a first end and a second end, a conical internal prechamber member, a rotating extension arm and a plurality of nozzles. The conical internal prechamber member is positioned at the second end of the conical main prechamber body. The rotating extension arm has a mechanical linkage to the conical internal prechamber member, extending from the conical internal prechamber member and through the first end of the conical main prechamber body to an actuator. The plurality of nozzles is formed at an interface between the conical main prechamber body and the conical internal prechamber member and is in fluid communication with a main combustion chamber of the internal combustion engine. The actuator controls and varies a size of each of the plurality of nozzles by moving the rotating extension arm upwards and downwards relative to the conical main prechamber body. The method includes injecting an air-fuel mixture into the prechamber using an auxiliary fuel supply; varying a size of each of the plurality of nozzles by moving the extension arm via the actuator upwards and downwards relative to the conical main prechamber body; rotating the extension arm via the actuator; igniting the air-fuel mixture in the prechamber with an ignition source; producing a pressurized partially combusted air-fuel mixture; and injecting the pressurized partially combusted air-fuel mixture into the main combustion chamber of the internal combustion engine through the plurality of nozzles.

In yet another aspect, embodiments disclosed herein relate to a method of operating a prechamber in a passive mode in an internal combustion engine using a system. The system includes a prechamber. The prechamber includes a conical main prechamber body with a first end and a second end, a conical internal prechamber member, an extension arm and a plurality of nozzles. The conical internal prechamber member is positioned at the second end of the conical main prechamber body. The extension arm has a mechanical linkage to the conical internal prechamber member, extending from the conical internal prechamber member and through the first end of the conical main prechamber body to an actuator. The plurality of nozzles is formed at an interface between the conical main prechamber body and the conical internal prechamber member and is in fluid communication with a main combustion chamber of the internal combustion engine. The system further includes a main combustion chamber of the internal combustion engine which includes an air inlet and a fuel inlet. The method includes injecting air through the air inlet and fuel through the fuel inlet into the main combustion chamber, producing an air-fuel mixture; receiving the air-fuel mixture from the main combustion chamber into the prechamber during a compression stroke; varying a size of each of the plurality of nozzles by moving the extension arm via the actuator upwards and downwards relative to the conical main prechamber body; rotating the extension arm via the actuator; igniting the air-fuel mixture in the prechamber with an ignition source, producing a pressurized partially combusted air-fuel mixture; and injecting the pressurized partially combusted air-fuel mixture into the main combustion chamber of the internal combustion engine through the plurality of nozzles.

Other aspects and advantages of the claimed subject matter will be apparent from the following description and the appended claims.

DETAILED DESCRIPTION

In one aspect, embodiments disclosed herein relate to a prechamber for an internal combustion engine. In another aspect, embodiments disclosed herein relate to a method of operating a prechamber in an active mode in an internal combustion engine. Operating the prechamber in an active mode relates to the usage of an auxiliary fuel supply within the prechamber. In yet another aspect, embodiments disclosed herein relate to a method of operating a prechamber in a passive mode in an internal combustion engine. Operating the prechamber in a passive mode relates to the usage of a prechamber without an auxiliary fuel supply.

Figure 1A:
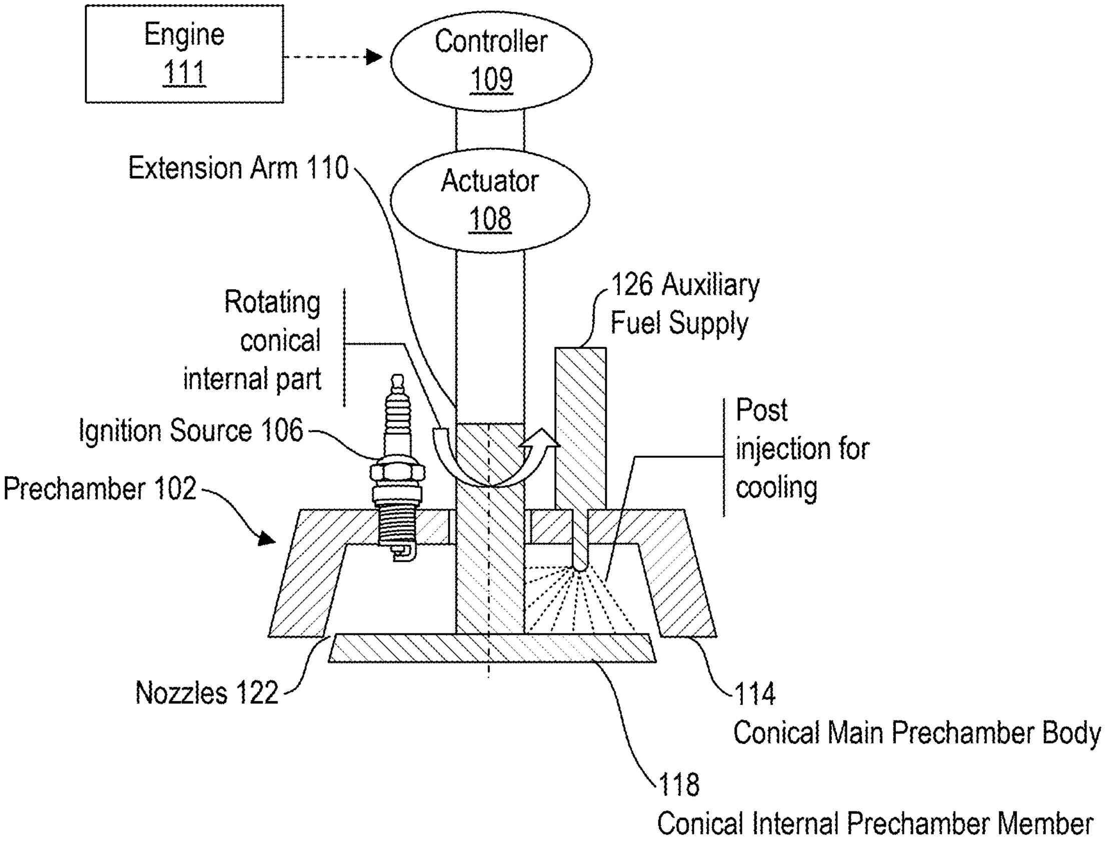
FIG. 1A depicts a prechamber for an internal combustion engine in accordance with one or more embodiments.

FIG. 1A depicts a prechamber 102 for an internal combustion engine in accordance with one or more embodiments. The main structure of the prechamber 102 is provided by a conical main prechamber body 114 which includes a first end and a second end. A conical internal prechamber member 118 is positioned at the second end of the conical main prechamber body 114 and is mechanically linked to a rotating extension arm 110. The rotating extension arm 110 is positioned on a central axis of the conical main prechamber body 114. The rotating extension arm 110 extends through the first end of the conical main prechamber body 114 to an actuator 108, which both rotates and moves the rotating extension arm 110. The actuator 108 may be a rack and pinion actuator, a cam actuator, a spring actuator, a crank actuator, a solenoid actuator, a servo motor, and a piezo-electric actuator. As the actuator 108 moves the rotating extension arm 110 upwards, towards the first end of the conical main prechamber body 114, and downwards, towards the second end of the conical main prechamber body 114, nozzles 122 are formed at an interface between the conical main prechamber body 114 and the conical internal prechamber member 118. These nozzles 122 are in fluid communication with a main combustion chamber (not shown) of the internal combustion engine and provide an air-fuel mixture, which may be partially combusted as is described in greater detail below, to the main combustion chamber.

The position of the conical internal prechamber member 118, controlled by the actuator 108, relative to the conical main prechamber body 114 results in a specified size for the nozzles 122. To decrease the size of the nozzles 122, the conical internal prechamber member 118 moves upwards, decreasing the space between the conical internal prechamber member 118 and the conical main prechamber body 114. To increase the size of the nozzles 122, the conical internal prechamber member 118 moves downwards, increasing the space between the conical internal prechamber member 118 and the conical main prechamber body 114.

The actuator 108 also controls the rotation of the rotating extension arm 110 connected to the conical internal prechamber member 118. Continual rotational motion is applied within the prechamber 102 by the rotating extension arm 110 generates shear layer turbulence to promote efficient and rapid combustion within the main combustion chamber. This rotation also prevents hot spots from forming on the extension arm 110 by evenly distributing the air-fuel mixture and the combusted air-fuel mixture within the prechamber. Hot spots, if not prevented, can cause unintended pre-ignition by igniting fuel or lubricant prematurely, which may result in engine knock. The rotation ensures an even distribution of fuel provided to the prechamber 102 (discussed in greater detail below), preventing any unintended fuel accumulation. Intermittent rotation can also occur as the rotating extension arm 110 and the conical internal prechamber member 118 move up and down to set the nozzle size.

As is shown in FIG. 1A, the actuator 108 is controlled by a controller 109. In one or more embodiments, the controller 109 controlling the actuator 108 is an Engine Control Unit (ECU). In other embodiments, the controller controlling the actuator 108 is a dedicated control module. During operations, the controller 109 receives inputs from the engine 111 related to operational characteristics such as engine speed, engine load, engine temperature, and engine stroke position. Based on these operational characteristics, the controller 109 sends a signal to the actuator 108 which will adjust the size of the nozzles 122 in real time. This real time adjustment allows for control of the air-fuel mixture characteristics within the prechamber 102, optimizing efficiency and performance based on specific requirements of the engine 111 during different phases of the engine cycle.

The prechamber 102 may include an auxiliary fuel supply 126 disposed in the first end of the conical main prechamber body 114. The auxiliary fuel supply 126 may be a fuel injector or a check valve. The prechamber 102 may be operated in either an active mode or a passive mode. In an active mode (shown in FIG. 1B), the auxiliary fuel supply 126 is utilized to inject fuel into the prechamber 102. In an active mode, the auxiliary fuel supply 126 may be a fuel injector used to dose small quantities of fuel. The timing and quantities of fuel injected into the prechamber 102 can be independently controlled. Alternatively, the auxiliary fuel supply 126 may be a check valve which utilizes a pressure differential between the fuel supply line and the prechamber 102 to allow fuel to flow into the prechamber 102. This fuel mixes with an air supply (not shown), producing an air-fuel mixture. The air-fuel mixture is ignited, and partially combusted, using an ignition source 106 also disposed in the first end of the conical main prechamber body 114. This ignition source 106 may be a spark plug or a glow plug. The combustion process pressurizes the prechamber and produces a pressurized partially combusted air-fuel mixture that is provided to the main combustion chamber via the nozzles 122.

Alternatively, in a passive mode (shown in FIG. 1C), the prechamber 102 may either not include an auxiliary fuel supply 126 or the auxiliary fuel supply 126 may be in an inactive state, preventing fuel from being injected into the prechamber 102. In the passive mode, the air-fuel mixture is formed in the main combustion chamber and received into the prechamber 102 through the nozzles 122 when the main combustion chamber is pressurized (which occurs during a compression stroke). No additional fuel is added through the prechamber 102 during the passive mode, thus passive mode is constrained by the ratios of air to fuel in the air-fuel mixture provided to the prechamber 102 by the main combustion chamber 128. Instead, the air-fuel mixture within the prechamber 102 is ignited using an ignition source 106, producing a pressurized partially combusted air-fuel mixture. The pressurized partially combusted air-fuel mixture is provided back to the main combustion chamber via the nozzles 122. Once the pressurized partially combusted air-fuel mixture is provided to the main combustion chamber, in either the active or the passive mode, a typical engine operational process may occur including injection of additional air and fuel into the main combustion chamber.

Figure 1B:
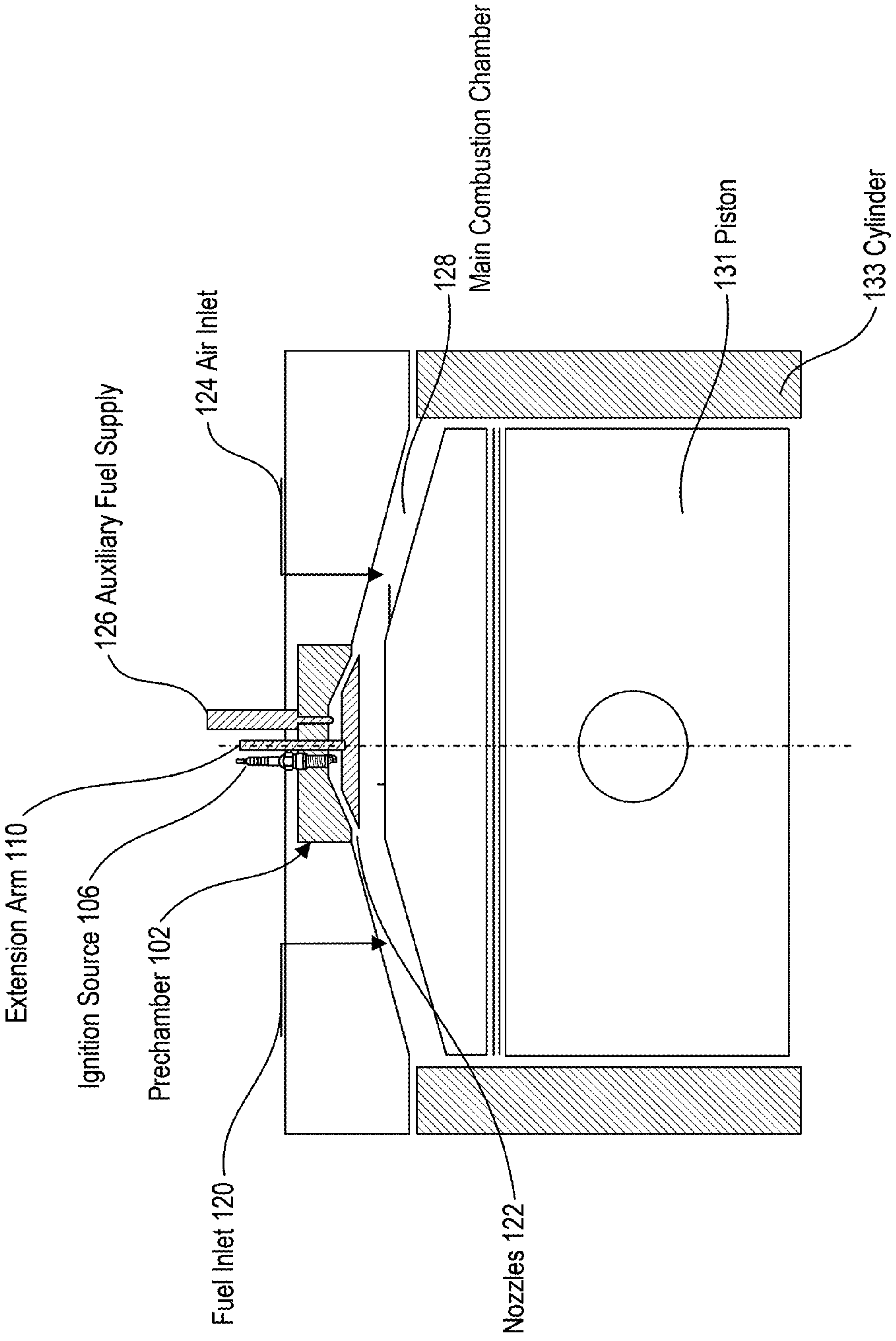
FIG. 1B depicts an engine cylinder with a prechamber for an internal combustion engine in accordance with one or more embodiments.
Figure 1C:
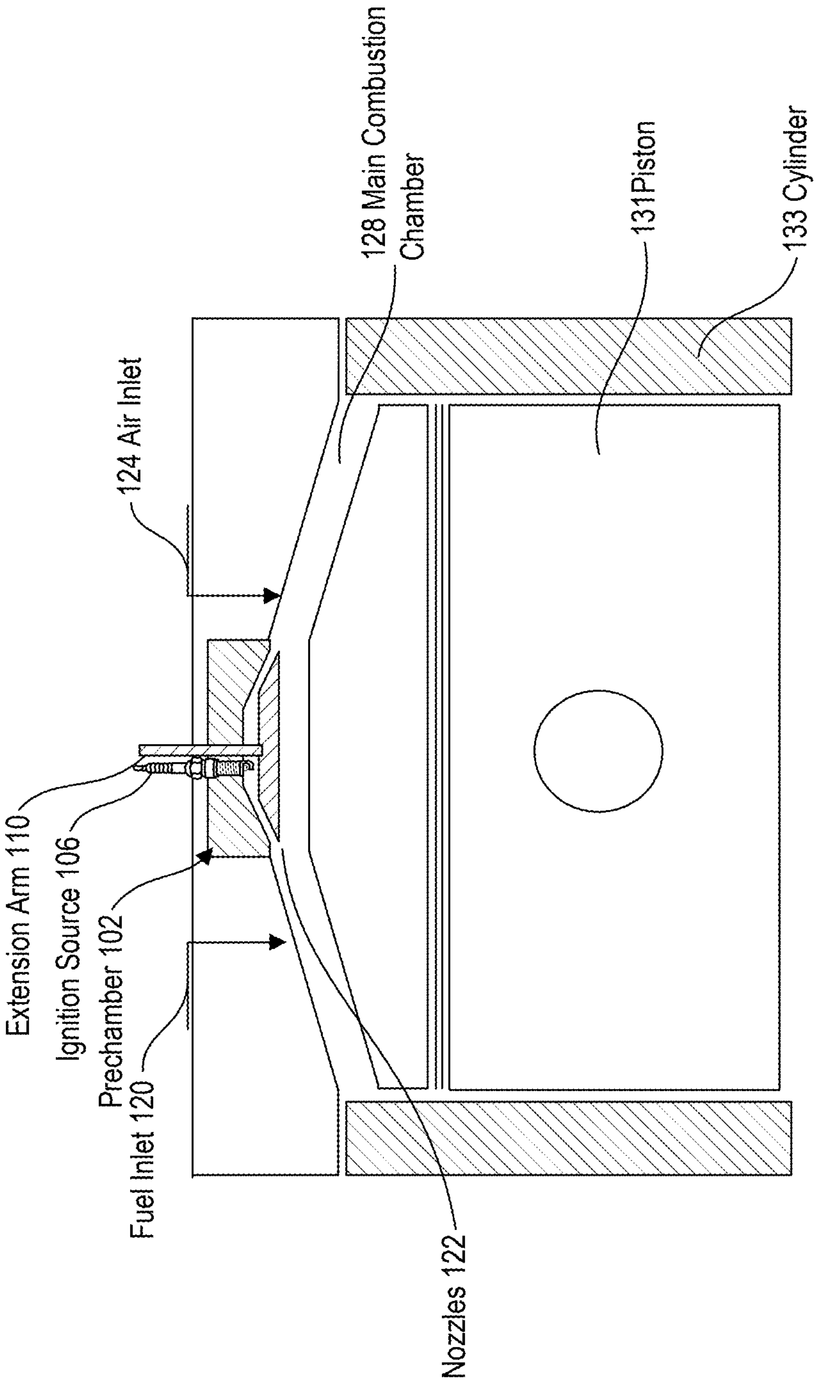
FIG. 1C depicts an engine cylinder with a prechamber for an internal combustion engine in accordance with one or more embodiments.

Turning to FIG. 1B, FIG. 1B depicts an engine cylinder with a prechamber for an internal combustion engine in accordance with one or more embodiments. The prechamber 102 described in FIG. 1A is disposed at the top of the cylinder 133 of this internal combustion engine. As described above, the prechamber 102 includes an ignition source 106, a rotating extension arm 110, and an auxiliary fuel supply 126. The prechamber 102 is in fluid communication with the main combustion chamber 128 via the nozzles 122. The main combustion chamber 128 is disposed within the cylinder 133, which also includes a piston 131, a fuel inlet 120, and an air inlet 124.

The piston 131 moves upwards and downwards in the cylinder 133 based on the current state of the internal combustion engine cycle. It is well understood that a standard internal combustion engine cycle includes four distinct processes: intake, compression, combustion and power stroke, and exhaust. As briefly discussed above, operational characteristics of the engine 111, including information on the engine cycle, may signal the controller 109 to adjust the actuator 108 in specific directions to result in a desired size of the nozzles 122. For example, during the combustion and power stroke or other high load operations, when higher pressure build up is desired for optimal operation, the size of the nozzles 122 may be reduced to cause a larger pressure build up in the prechamber, resulting in an increased residence time in the prechamber 102, an increased jet speed, and higher turbulence of the jets of the air-fuel mixture exiting the prechamber 102 in the main combustion chamber. The residence time in the prechamber 102 may indicate how complete the combustion process is, with higher residence times resulting in more complete combustion. The jet speed is defined as the speed of the pressurized partially combusted air-fuel mixture exiting the prechamber 102 and entering the main combustion chamber 128. The turbulence of the jets implies the level of mixing within the main combustion chamber 128, such that when the pressurized partially combusted air-fuel mixture is at a high jet speed, this creates a highly turbulent environment in the main combustion chamber 128, resulting in enhanced mixing of any air and fuel within the main combustion chamber 128. In general, improved mixing of air and fuel within the main combustion chamber 128 results in a more effective ignition and a more complete combustion process in the main combustion chamber 128. If, however, the jet speed surpasses a specific threshold, impingement of the jets on the piston 131 and other surfaces may cause a loss of turbulence and efficiency. In this case, the actuator 108 will receive a signal to adjust the location of the conical internal prechamber member 118 and increase the size of the nozzles 122 to slow the jet speed. In general, using a larger size for the nozzles 122 is desirable during low load conditions to improve the scavenging effect within the prechamber to reduce combustion emissions which typically become trapped inside the prechamber during the exhaust stroke of the engine. The trapped combustion emissions typically lead to suboptimal filling of the prechamber with fresh air and fuel in the next engine cycle, which can be exacerbated by a prechamber nozzle with a small size due to the large pressure drop in the prechamber during the scavenging. An object of one or more embodiments is to improve the scavenging of combustion emissions which can be realized by enlarging the nozzle opening and thus reducing the pressure drop in the prechamber 102.

Figures 2A, 2B:
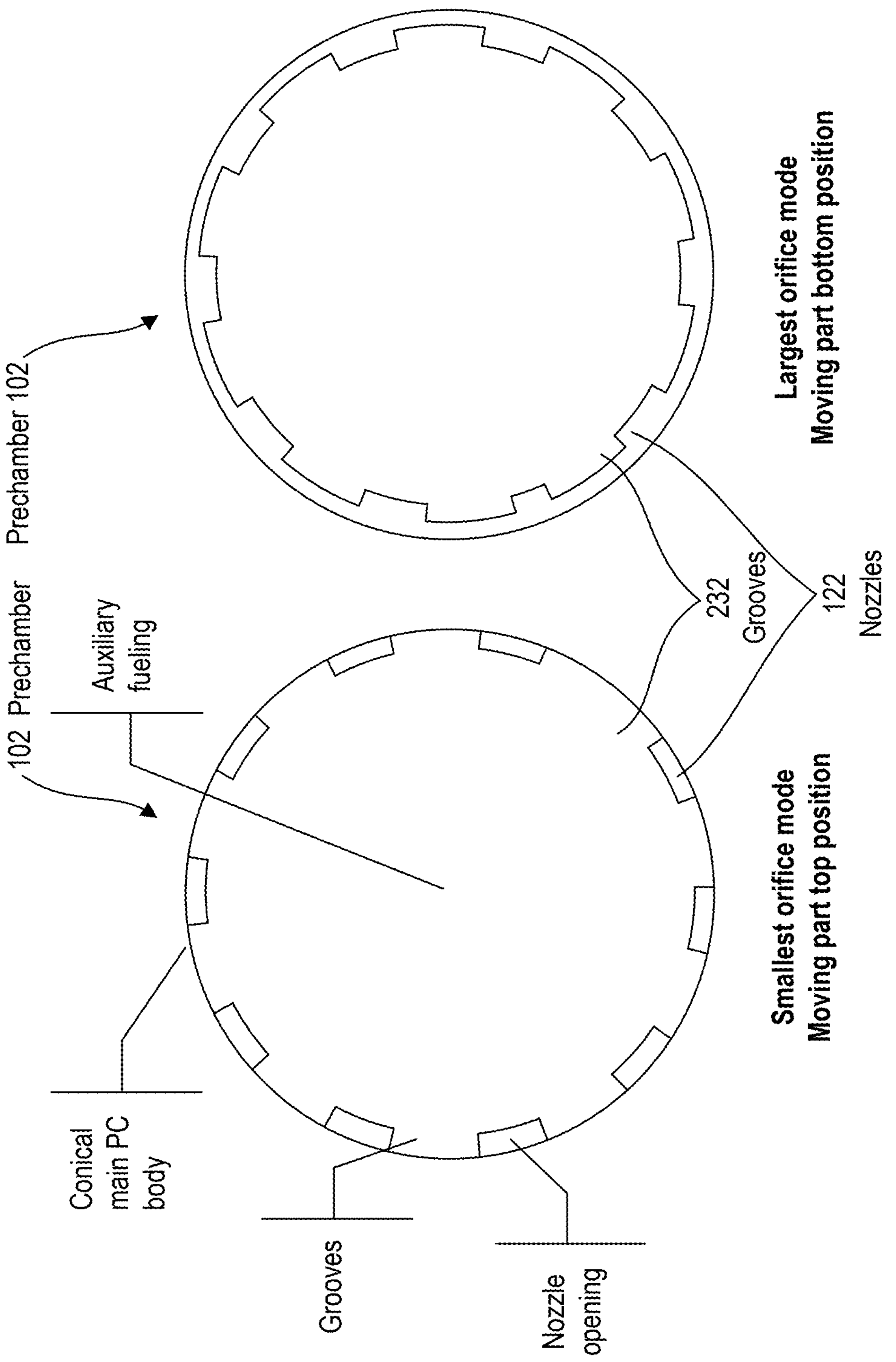
FIGS. 2A-2B depict a below view of a prechamber for an internal combustion engine in accordance with one or more embodiments.

FIGS. 2A-2B depict a below view of a prechamber for an internal combustion engine in accordance with one or more embodiments. Specifically, FIG. 2A illustrates a small nozzle configuration, when the conical internal prechamber member 118 is positioned close to the conical main prechamber body 114, resulting in smaller nozzles 122. As shown, grooves 232 are present on an outer surface of the conical internal prechamber member 118 between the nozzles 122 to assist in forming the nozzles themselves 122 and separating the air-fuel mixture into discrete jets. A discrete jet increases the total surface area of the jets creating more contact with the main chamber mixture. FIG. 2B illustrates a larger nozzle configuration, when the conical internal prechamber member 118 is positioned lower than the conical main prechamber body 114, resulting in a gap and thus larger nozzles 122, which may not be strictly discrete jets as the size of the nozzle increases and overlap occurs. In the larger nozzle configuration, the gap between the conical main prechamber body 114 and the conical internal prechamber member 118 becomes continuous producing a blended jet which may be a hollow cone-shaped jet in some embodiments. FIG. 2A represents a maximum upward location for the conical internal prechamber member 118 while FIG. 2B represents a maximum downward location for the conical internal prechamber member 118 relative to the conical main prechamber body 114. Though not explicitly shown, the size of the nozzles 122 may vary between the size formed by the maximum upward location for the conical internal prechamber member 118 and the maximum downward location for the conical internal prechamber member 118.

Figures 3A, 3B:
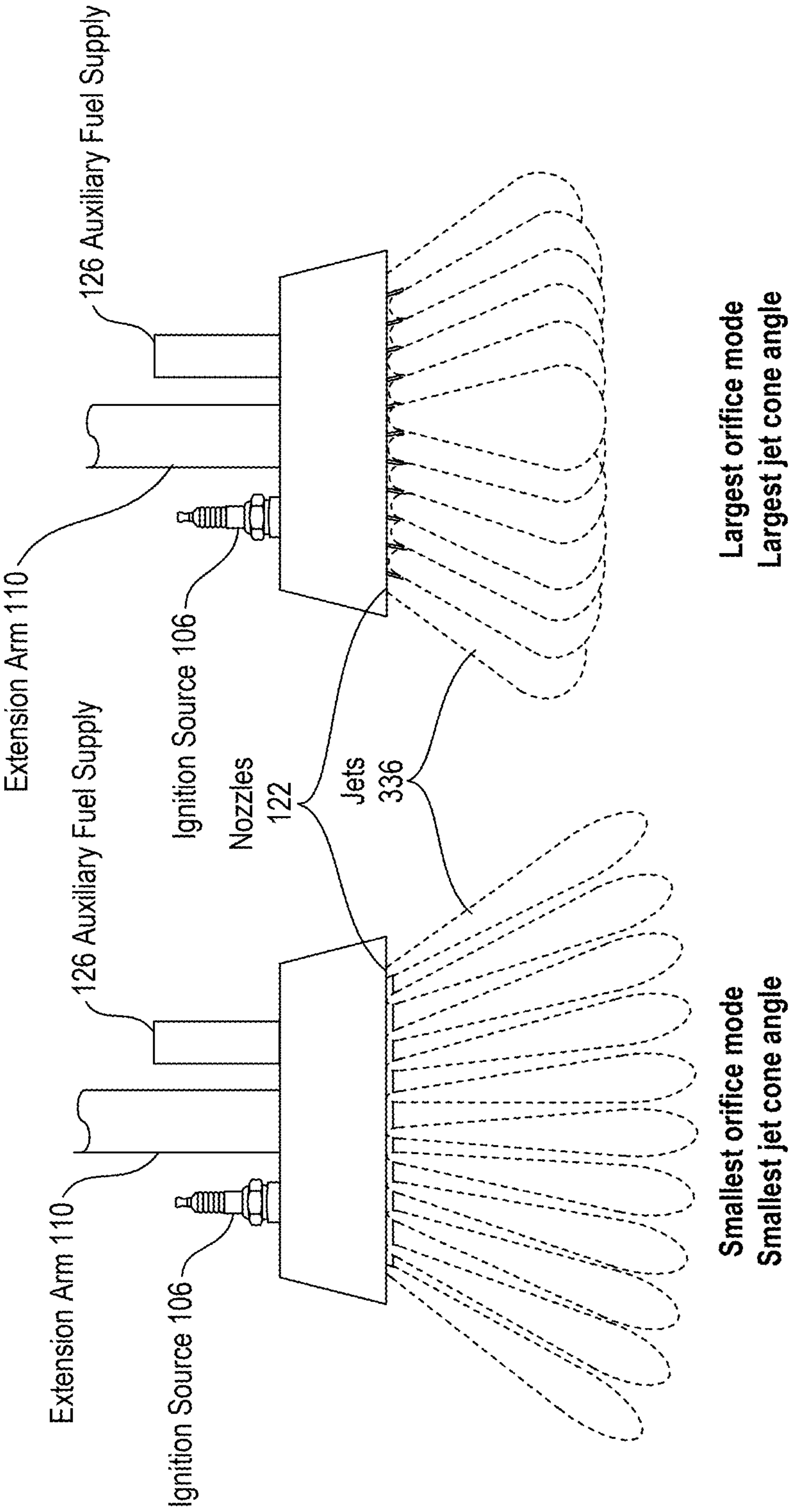
FIGS. 3A-3B depict jets and a prechamber in an internal combustion engine in accordance with one or more embodiments.

FIGS. 3A-3B depict air-fuel mixture jets and a prechamber in an internal combustion engine in accordance with one or more embodiments. FIG. 3A specifically shows the resulting jets 336 when the nozzles 122 are in the position illustrated in FIG. 2A, where the conical internal prechamber member 118 is in the maximum upward location relative to the conical main prechamber body 114. In this configuration, the nozzles 122 are at a minimum orifice size and result in a minimum jet cone angle. This is clear from FIG. 3A in the narrow jet streams produced. FIG. 3B shows the resulting jets 336 when the nozzles 122 are in the position illustrated in FIG. 2B, where the conical internal prechamber member 118 is in the maximum downward location for the conical internal prechamber member 118. In this configuration, the nozzles 122 are at a maximum orifice size and result in a maximum jet cone angle. This is clear from FIG. 3B in the wide angled jet streams produced. In general, at larger nozzle sizes, the total flow rate of the air-fuel mixture increases while pressure build-up in the prechamber 102 and jet discharge duration decreases. The larger nozzle sizes also result in a lower residence time of the air-fuel mixture within the prechamber 102. Further, increased jet angles induce more charge motion in both the prechamber 102 and the main combustion chamber 128.

Figure 4:
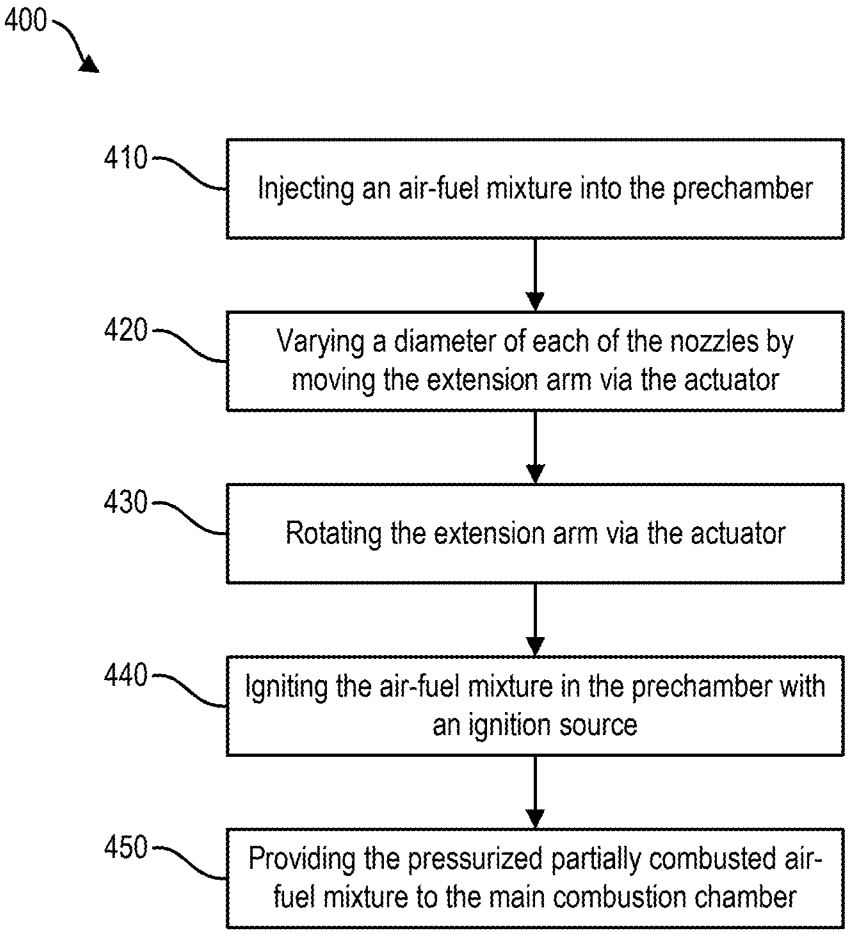
FIG. 4 depicts a method of operating a prechamber in an active mode in an internal combustion engine in accordance with one or more embodiments.

FIG. 4 depicts a method 400 of operating a prechamber in an active mode in an internal combustion engine in accordance with one or more embodiments. In step 410, an air-fuel mixture is injected into the prechamber using an auxiliary fuel supply. In step 420, the size of each of the nozzles is varied by moving the extension arm via the actuator based on operational characteristics of the internal combustion engine. In step 430, the actuator rotates the extension arm. In step 440, the air-fuel mixture is ignited in the prechamber with an ignition source, resulting in a pressurized partially combusted air-fuel mixture. In step 450, the pressurized partially combusted air-fuel mixture is provided to the main combustion chamber of the internal combustion engine through the nozzles.

Figure 5:
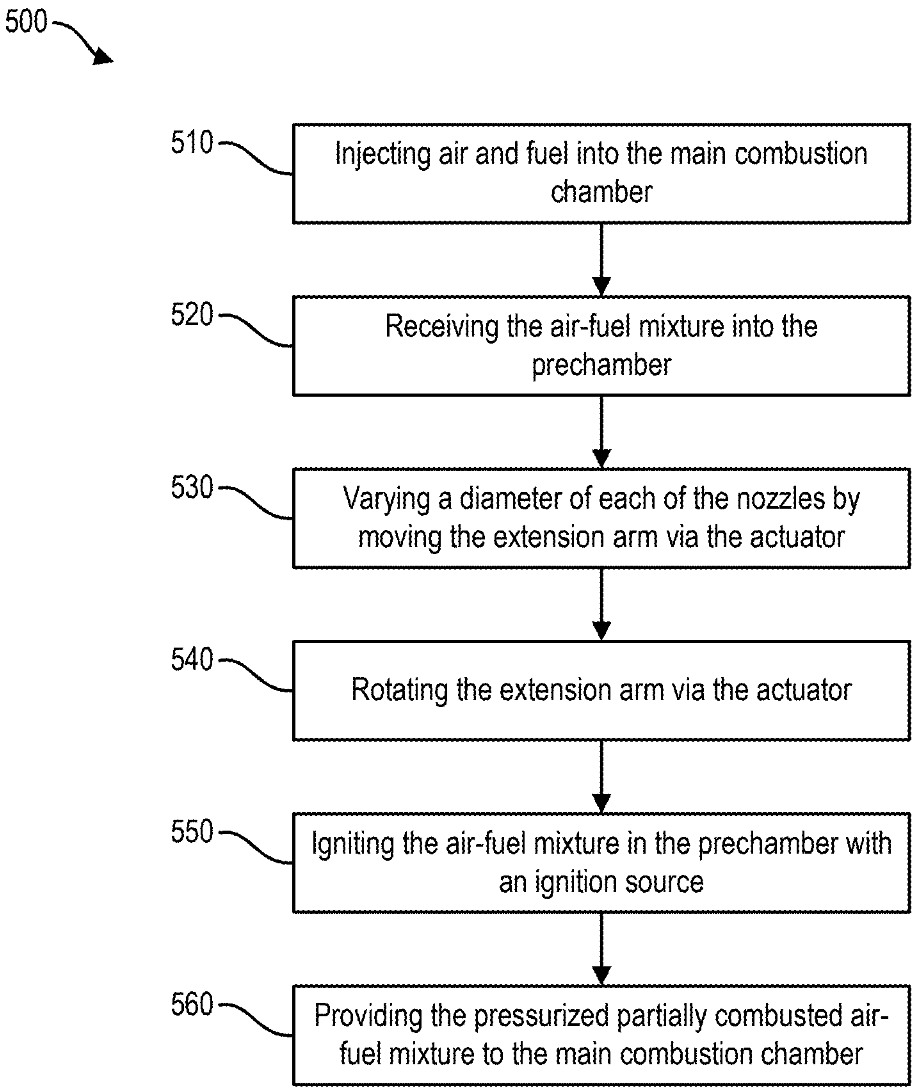
FIG. 5 depicts a method of operating a prechamber in a passive mode in an internal combustion engine in accordance with one or more embodiments.

FIG. 5 depicts a method 500 of operating a prechamber in a passive mode in an internal combustion engine in accordance with one or more embodiments. In step 510, air is injected through an air inlet and fuel is injected through a fuel inlet into the main combustion chamber, producing an air-fuel mixture. In step 520, the air-fuel mixture is received from the main combustion chamber into the prechamber during a compression stroke. The compression stroke provides the pressure to push the air-fuel mixture through the nozzles and into the prechamber as the piston rises through the cylinder. In step 530, the size of each of the nozzles is varied by moving the extension arm via the actuator based on operational characteristics of the internal combustion engine. In step 540, the actuator rotates the extension arm. In step 550, the air-fuel mixture is ignited in the prechamber with an ignition source, resulting in a pressurized partially combusted air-fuel mixture. In step 560, the pressurized partially combusted air-fuel mixture is provided to the main combustion chamber of the internal combustion engine through the nozzles.

Example

Figure 6A:
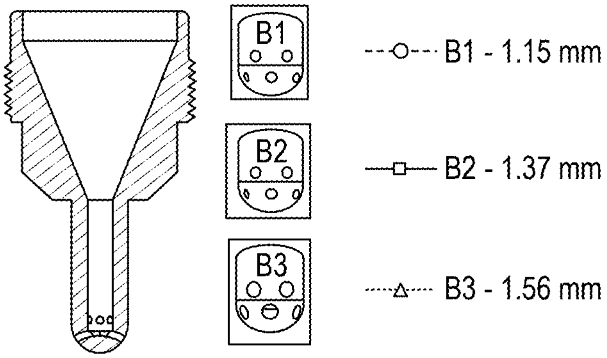
FIG. 6A depicts various nozzle sizes for a simulation of a prechamber in an internal combustion engine in accordance with one or more embodiments.

To quantify the impact of varying the nozzle size, computational fluid dynamics (CFD) simulations were conducted with 3 different nozzle sizes including 1.15 mm, 1.37 mm, 1.56 mm in size. FIG. 6A illustrates the nozzle sizes. The prechamber used in the simulations fit within an in-series heavy-duty diesel engine. In this configuration, the central injector of the engine was replaced with a prechamber assembly as described above. The prechamber volume and total nozzle opening area was chosen based on previous studies (Gussak et al. 1980 and Shah et al. 2015) in a heavy-duty engine. The ratio of the prechamber volume to the engine clearance volume is 2.5%. Due to the small size of the nozzle tip, the desired total nozzle opening area was achieved by incorporating 12 nozzle holes arranged in two layers of 6 holes each. A 30-degree radial offset was introduced between the two layers. The nozzle umbrella angle was set at 134 degrees. Tip protrusion was maintained constant for all design variants.

Figure 6B:
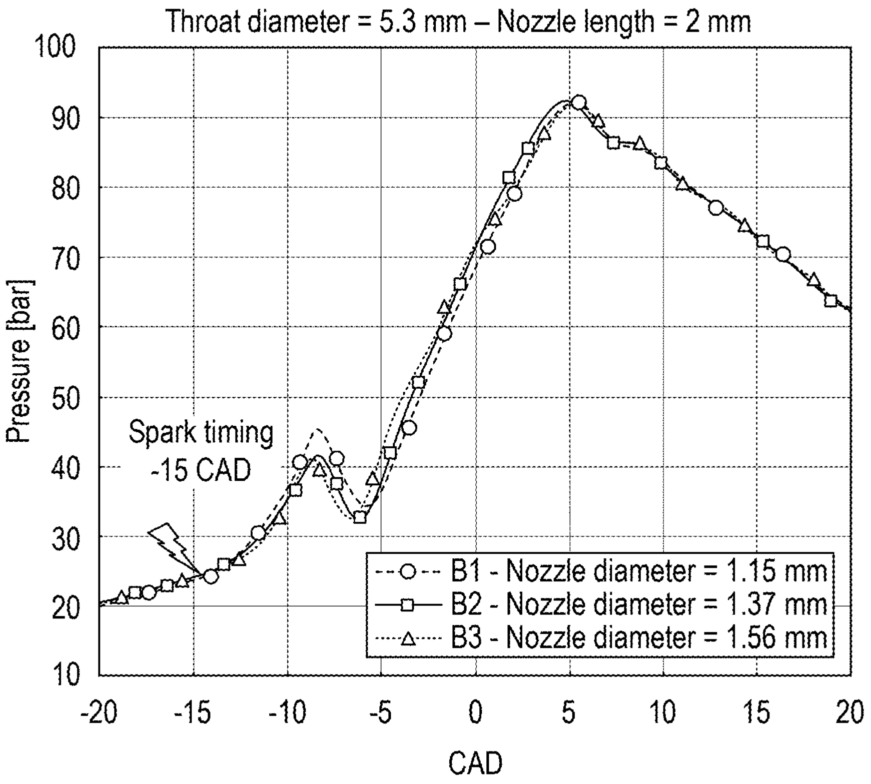
FIG. 6B depicts pressure against crank angle degree for a simulation of a prechamber in an internal combustion engine in accordance with one or more embodiments.

FIG. 6B shows the pressure against the crank angle degree (CAD) for each of the nozzle sizes. Notably, FIG. 6B shows that for smaller nozzle sizes, the peak pressure in the prechamber is the highest due to a larger residence time of the air-fuel mixture in the prechamber, resulting in a larger trapped mass and extended reaction time. As discussed above, longer residence times generally produce more complete combustion products, unlike shorter residence times, which directly affect the composition of the jets expelled from the prechamber.

Figure 6C:
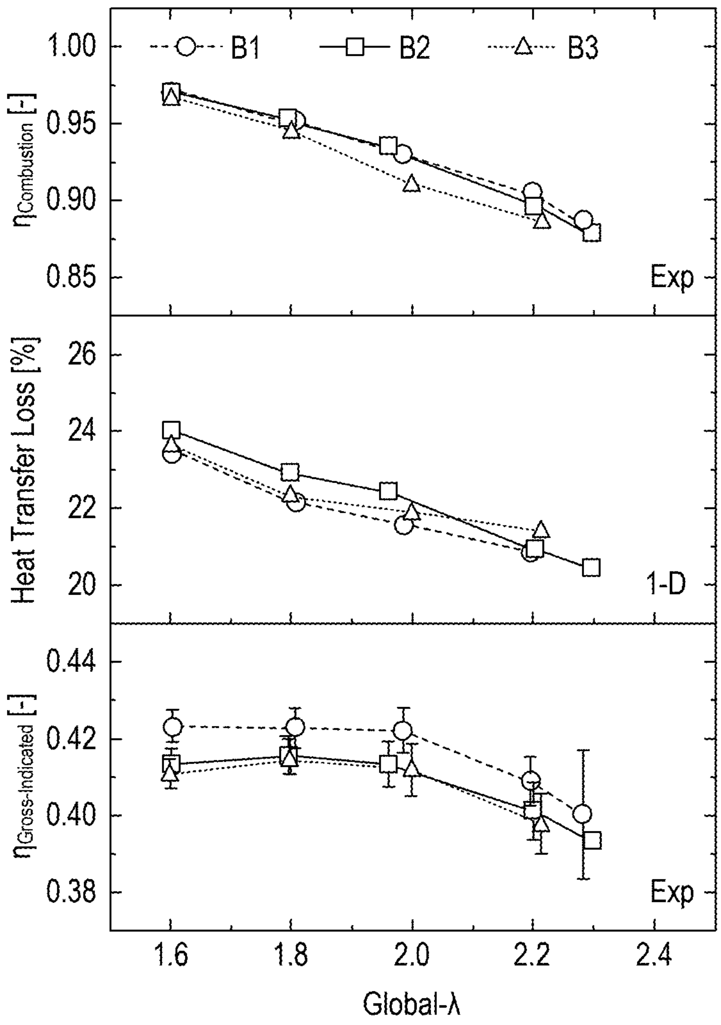
FIG. 6C depicts engine testing results for various nozzle sizes for a simulation of a prechamber in an internal combustion engine in accordance with one or more embodiments.

Tests were run on the engines using the three different nozzle sizes using methane fuel and an active prechamber configuration fueling at varying global air-fuel ratios (2). FIG. 6C compares the combustion efficiency, heat transfer loss, and gross-indicated efficiency as a function of global air-fuel ratio. In FIG. 6C, the upper graph of combustion efficiency ($\eta_{Combustion}$) shows that the combustion efficiency is slightly higher for the smallest nozzle size. As the air-fuel ratio increases (resulting in a leaner mixture), the combustion efficiency gradually decreases for all nozzle sizes. This trend suggests that the smaller nozzle design may have slight advantages in maintaining combustion efficiency, particularly at leaner operating conditions. The middle graph showing heat transfer loss (%) as a percentage of total energy shows a reduction in heat transfer loss as the mixture becomes leaner (with higher air-fuel ratios). The smallest nozzle size consistently shows slightly lower heat transfer losses compared to the two larger nozzle sizes, implying improved thermal management with the smaller nozzle size. The lower graph shows gross-indicated efficiency ($\eta_{Gross\text{-}indicated}$), which is an indication for the overall performance of the engine. While the values for gross-indicated efficiency remain similar for all nozzle sizes, the smallest and largest nozzle maintain slightly higher efficiency at lower air-fuel ratios. The data indicates that smaller nozzles tend to have slightly improved performance in terms of combustion efficiency and thermal losses, particularly at leaner conditions. The gross-indicated efficiency remains competitive across all configurations with slight advantages for the smallest nozzle size at richer (lower) air-fuel ratios. The results illustrated throughout FIG. 6C suggest that prechamber nozzle size influences the overall thermal and combustion performance of the engine, especially in lean air-fuel mixture scenarios.

Any combinations of the various embodiments and implementations disclosed herein can be used in a further embodiment, consistent with the disclosure. Other aspects and advantages of the claimed subject matter will be apparent from the following description and the appended claims.

Embodiments of the present disclosure may provide at least one of the following advantages. The prechamber configuration results in improved combustion efficiency, as the variable nozzle sizes enable precise control of the pressure build-up within the prechamber and jet characteristics, resulting in improved combustion efficiency. The optimized arrangement results in a more complete combustion with less fuel waste and maximum energy extraction from the fuel. Further, the engine performance is enhanced as the controlled pressure build-up within the prechamber during the power stroke improves combustion stability and power output. The improved ignition distribution results in optimal engine operation, performance, and increased torque. The improved combustion efficiency achieved through the variable nozzle sizes reduces emissions of pollutants such as unburned hydrocarbons, carbon monoxide, and nitrogen oxides. The variable nozzle size allows for a flexible engine size to adapt to varying operating conditions such as engine load, speed, and environmental factors. The variable nozzle size improves the scavenging effect within the prechamber during the exhaust cycle, helping to efficiently remove exhaust gases, reducing residual gas content, and enhancing the environment for subsequent combustion cycles. The variable nozzle prechamber may be used in various types of internal combustion engines including gasoline and natural gas engines, making it suitable for a variety of applications from automotive engines to industrial and power generation systems.

Although only a few example embodiments have been described in detail above, those skilled in the art will readily appreciate that many modifications are possible in the example embodiments without materially departing from this invention. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed:

1. A prechamber for an internal combustion engine, comprising: a conical main prechamber body comprising a first end and a second end; a conical internal prechamber member comprising grooves on an outer surface, positioned at the second end of the conical main prechamber body; a rotating extension arm, with a mechanical linkage to the conical internal prechamber member, extending from the conical internal prechamber member and through the first end of the conical main prechamber body to an actuator; and a plurality of nozzles, formed at an interface between the conical main prechamber body and the conical internal prechamber member, in fluid communication with a main combustion chamber of the internal combustion engine; wherein the actuator controls and varies a size of each of the plurality of nozzles by moving the rotating extension arm upwards and downwards relative to the conical main prechamber body.

2. The prechamber of claim 1, further comprising an ignition source disposed in the first end of the conical main prechamber body.

3. The prechamber of claim 2, wherein the ignition source is a spark plug.

4. The prechamber of claim 2, wherein the ignition source is a glow plug.

5. The prechamber of claim 1, further comprising an auxiliary fuel supply disposed in the first end of the conical main prechamber body.

6. The prechamber of claim 5, wherein the auxiliary fuel supply is a fuel injector.

7. The prechamber of claim 5, wherein the auxiliary fuel supply is a check valve.

8. The prechamber of claim 1, wherein the rotating extension arm is positioned on a central axis of the conical main prechamber body.

9. The prechamber of claim 1, wherein the actuator is controlled by an Engine Control Unit (ECU).

10. The prechamber of claim 1, wherein a size of the conical main prechamber body is larger than a size of the conical internal prechamber member.

11. The prechamber of claim 1, wherein the actuator is selected from the group consisting of a rack and pinion actuator, a cam actuator, a spring actuator, a crank actuator, a solenoid actuator, a servo motor, and a piezo-electric actuator.

12. A method of operating a prechamber in an active mode in an internal combustion engine, using a system comprising: a conical main prechamber body comprising a first end and a second end; a conical internal prechamber member comprising grooves on an outer surface, positioned at the second end of the conical main prechamber body; an extension arm, with a mechanical linkage to the conical internal prechamber member, extending from the conical internal prechamber member and through the first end of the conical main prechamber body to an actuator; and a plurality of nozzles, formed at an interface between the conical main prechamber body and the conical internal prechamber member, in fluid communication with a main combustion chamber of the internal combustion engine; the method, comprising: injecting an air-fuel mixture into the prechamber using an auxiliary fuel supply; varying a size of each of the plurality of nozzles by moving the extension arm via the actuator upwards and downwards relative to the conical main prechamber body; rotating the extension arm via the actuator; igniting the air-fuel mixture in the prechamber with an ignition source, producing a pressurized partially combusted air-fuel mixture; and injecting the pressurized partially combusted air-fuel mixture into the main combustion chamber of the internal combustion engine through the plurality of nozzles.

13. The method of claim 12, further comprising controlling the actuator via an Engine Control Unit (ECU).

14. The method of claim 12, wherein the varying the size of each of the plurality of nozzles is based on one or more of engine speed, engine load, engine temperature, engine stroke position, and combinations thereof.

15. The method of claim 12, wherein rotating the extension arm via the actuator allows for an even distribution of the air-fuel mixture in the prechamber thereby reducing hot spots on the extension arm.

16. A method of operating a prechamber in a passive mode in an internal combustion engine, using a system comprising: a prechamber, comprising: a conical main prechamber body comprising a first end and a second end; a conical internal prechamber member comprising grooves on an outer surface, positioned at the second end of the conical main prechamber body; an extension arm, with a mechanical linkage to the conical internal prechamber member, extending from the conical internal prechamber member and through the first end of the conical main prechamber body to an actuator; and a plurality of nozzles, formed at an interface between the conical main prechamber body and the conical internal prechamber member, in fluid communication with a main combustion chamber of the internal combustion engine; and a main combustion chamber of the internal combustion engine comprising an air inlet and a fuel inlet; the method, comprising: injecting air through the air inlet and fuel through the fuel inlet into the main combustion chamber, producing an air-fuel mixture; receiving the air-fuel mixture from the main combustion chamber into the prechamber during a compression stroke; varying a size of each of the plurality of nozzles by moving the extension arm via the actuator upwards and downwards relative to the conical main prechamber body; rotating the extension arm via the actuator; igniting the air-fuel mixture in the prechamber with an ignition source, producing a pressurized partially combusted air-fuel mixture; and injecting the pressurized partially combusted air-fuel mixture into the main combustion chamber of the internal combustion engine through the plurality of nozzles.

17. The method of claim 16, further comprising controlling the actuator via an Engine Control Unit (ECU).

18. The method of claim 16, wherein the varying the size of each of the plurality of nozzles is based on one or more engine speed, engine load, engine temperature, engine stroke position, and combinations thereof.

19. The method of claim 16, wherein rotating the extension arm via the actuator allows for an even distribution of the air-fuel mixture in the prechamber thereby reducing hot spots on the extension arm.

* * * * *